United States Patent Office 3,392,605
Patented July 16, 1968

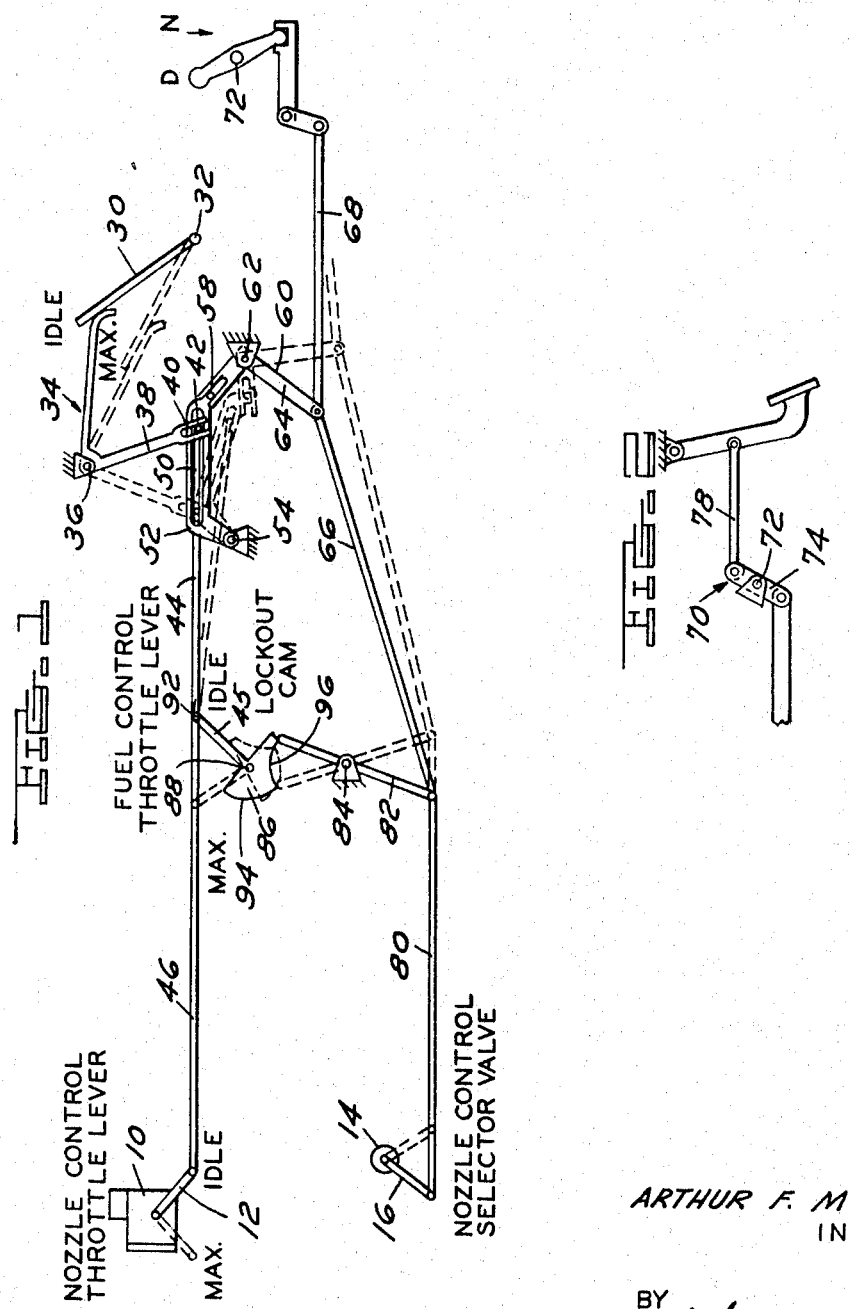

3,392,605
VEHICLE ACCELERATOR PEDAL-TRANSMISSION SELECTOR LEVER INTERCONNECTING LINKAGE
Arthur F. McLean, Livonia, Mich., assignor to Ford Motor Company, Dearborn, Mich., a corporation of Delaware
Filed Nov. 3, 1966, Ser. No. 591,823
23 Claims. (Cl. 74—878)

This invention, in general, relates to a system of links and levers for providing a controlled interconnection between a motor vehicle accelerator pedal and an operator movable transmission gear-ratio establishing control member.

More particularly, the invention relates to an accelerator pedal-transmission gear-ratio selector lever/clutch pedal linkage for use in a motor vehicle having a gas turbine engine power plant coupled either to an automatic or manually operable transmission; the linkage preventing conditioning the transmission for a no-drive or Neutral operation as long as the accelerator pedal is depressed, and rendering movement of the accelerator pedal ineffective to control the fuel supply to the engine when the transmission is conditioned for a particular mode of operation.

When a gas turbine engine is installed in a motor vehicle as the main source of driving power, and is coupled to either an automatic or manually operable transmission, some means must be provided to prevent engine runaway operation resulting from a sudden decrease in load when the transmission either is being shifted to another gear ratio, or placed in Neutral. Conversely, means should be provided to prevent placing of the transmission in Neutral so long as the accelerator pedal is depressed. In applicant's copending application Ser. No. 515,356, Turbine Nozzle Actuator, filed Dec. 21, 1965, and having a common assignee, and engine output shaft speed governing mechanism is provided to maintain a constant engine output shaft speed during the period when the transmission is being shifted from one gear ratio setting to another, or when it is placed in Neutral. Such a control prevents engine runaway, and permits a driving of the engine accessories, such as, for example, the air conditioning unit, air compressor, alternator, etc., from the engine output shaft instead of in the conventional manner from the gas generator spool of the engine. That is, since the engine output shaft is maintained at a constant speed, sudden changes in load on the output shaft, when the air conditioning units phase in or out automatically, do not appreciably affect the engine idle speed, and therefore, do not subject the engine to extreme conditions of operations.

The invention is directed primarily to a linkage system that automatically disconnects the vehicle accelerator pedal from the fuel control linkage when either the transmission gear ratio selector lever is moved to a neutral condition, or the conventional clutch pedal is depressed, to thereby permit a closing down of the engine fuel control and a governing of the fuel by the mechanism fully shown and described in the above mentioned Ser. No. 515,356. The pedal disconnect linkage additionally includes lock-out means to prevent shifting of the transmission selector lever from a drive range of operation, or depression of the clutch pedal, when the accelerator pedal/ fuel control lever is moved from its minimum or idle operating position.

It is, therefore, a primary object of the invention to provide a motor vehicle pedal disconnect linkage providing a controlled interconnection between the vehicle accelerator pedal linkage and the transmission gear ratio selector lever linkage or clutch pedal in a manner to return the engine to its idle speed operation whenever the selector lever is moved or the clutch pedal depressed to condition the transmission for Neutral, and to prevent shifting of the transmission to Neutral when the engine is operating above its idle setting.

Other objects, features and advantages of the invention will become apparent upon reference to the succeeding detailed description thereof, and to the drawing illustrating the preferred embodiments thereof, wherein;

FIGURE 1 shows, schematically, a control linkage embodying the invention; and,

FIGURE 2 illustrates a modification of the linkage illustrated in FIGURE 1 for adapting the pedal disconnect linkage for use with a manually operated clutch pedal.

Before proceeding with the detailed description of the invention, it is to be noted that the pedal disconnect linkage to be described is particularly adapted for use with the nozzle actuator control fully shown and described in the above-mentioned Ser. No. 515,356. It will be clear, however, that it would have use in many other installations not only for controlling the operation of a gas turbine engine coupled to a transmission, but also wherever it is desired to interconnect a pair of linkage systems in the manner to be described.

The above-mentioned Ser. No. 515,356 shows, in FIGURE 2 thereof, a servo mechanism for changing the attitude, pitch, or position of the movable nozzles of the power turbine of a gas turbine engine between an engine accelerating position or an engine braking position. The control includes a rotatable throttle valve member 16 that, at its lower end, has a right angled attachment to a lever 98 adapted, in a manner to be described, to be connected to both the conventional motor vehicle accelerator pedal and the engine fuel control throttle lever. This permits a progressive rotation of the throttle valve member 16 to correctly schedule the supply of fluid to the servo to accurately position the power turbine nozzles as a function of the position of the vehicle accelerator pedal and fuel control. The throttle valve member 16 and its actuating link 98 are shown herein in FIGURE 1 at the upper left-hand side, and are indicated respectively by the numeral 10 and 12.

The control system of S.N. 515,356 also includes, in FIGURE 2 thereof, an operator controlled rotatable selector valve 20, which, when rotated counterclockwise 90°, permits flow of an engine output shaft speed responsive governing fluid to the nozzle actuator servo to position the nozzles for an engine braking condition. In FIGURE 1 herein, the selector valve 20 of S.N. 515,356 is indicated at 14, fixedly secured to and rotated by a link 16.

In general, the control linkage of the invention includes a first articulated linkage 68, 66 and 80 between the transmission gear ratio selector lever/clutch pedal 72 and nozzle control selector valve 14. A second articulated linkage 34, 44, 46 is provided connecting the vehicle accelerator pedal 30 both to an engine fuel control lever 45 and nozzle control throttle lever 12. The above described linkages are interconnected by a further linkage 52, 60 that is so constructed and arranged that when the transmission selector lever/clutch pedal 72 is positioned to break the powertrain through the transmission; i.e., condition the transmission for Neutral, the accelerator pedal 30 is effectively disconnected from both the fuel and nozzle control throttle levers 45 and 12. An additional linkage 82 is also provided between the two main linkages so that when accelerator pedal 30 is depressed to move the fuel control lever 45, a lock-out cam 86 prevents depression of the conventional clutch pedal, or movement of the transmission gear ratio selector lever from the driving range in which it is positioned.

More specifically, FIGURE 1 shows a linkage control system that includes a conventional motor vehicle accelerator pedal 30. The pedal in this case is arcuately swingable about a fixed pivot 32 at one end, although it will be clear that it could be suspended or arcuately movable in other suitable ways without departing from the scope of the invention. It is necessary only that the pedal be movable to abut the curved end of a substantially right angle bell crank lever 34 that is mounted about a fixed pivot 36.

The leg 38 of lever 34, remote from accelerator pedal 30, is provided with an open end slot 40 that is adapted to receive a pin 42 slidably therein. The pin is secured to the end of a first force transmitting link 44. Link 44 is pivotally secured both to a pivotally mounted fuel control throttle lever 45, and to a link 46 pivotally connected to the nozzle control throttle lever link 12. Lever 45 controls the fuel to the engine, and is movable between the minimum or idle and maximum positions indicated.

The pin and slot connection 40, 42 not only provides a pivotal force transmitting linkage connection between the accelerator pedal and the fuel and nozzle control throttle levers, but also permits disconnection of the accelerator pedal from the levers 45 and 12 by a downward movement of pin 42 out of slot 40. When this occurs, of course, arcuate swinging of bell crank lever 34 has no further effect on the movement of fuel and nozzle control throttle levers 45 and 12.

The end of pin 42 projects slidably through a slot 50 in a right angle-like control lever 52. Lever 52 is pivotally mounted at one end on a portion 54 of a stationary housing, not shown. At its other end, lever 52 has a pin-cam and slot type motion compensating connection 56, 58, to one leg 59 of a second right angle bell crank lever 60. Lever 60 in turn has a fixed fulcrum 62 near its midpoint, the end of its other leg 64 being pivotally connected to the ends of a pair of links 66 and 68 that form a part of the transmission lever linkage system. It will be clear, of course, that the sliding interconnections between lever 34 and links 52 and 44, and between lever 60 and lever 52 permit the necessary movements of the levers and links without binding and without adding unnecessary friction to the system.

Lower link 68 is shown in FIGURE 1 as connected through a direction reversing linkage 70 to a transmission gear ratio selector lever 72. The linkage 70 includes a link 74 arcuately swingable about a fixed pivot 76 and pivotally connected at its opposite ends to link 68 and to a link 78. The link 78 in turn is pivotally connected to the bottom portion of a selector lever 72 that is rockable about a fixed pivot 80.

The selector lever in this case is suitable for use with either an automatically operated or a manually operated transmission. It would be movable from the inclined full line position shown to the right dotted line position to condition the transmission for a particular operation.

Assume, for example, that in the position shown, the transmission would be conditioned for a drive range either automatically establishing different gear ratio settings according to vehicle speed and accelerator pedal position, or establishing a particular gear ratio drive, as would be the case for a manually operated transmission, and that movement to the right or vertical dotted line position conditions the transmission for Neutral or non-drive operation. Movement of lever 72, of course, causes a linear movement of link 68 to the left or right, as the case may be.

It will be clear that a conventional clutch pedal could be substituted for lever 72, such as is shown in FIGURE 2, so that depression of the pedal would condition the transmission for Neutral in the same manner as lever 72 in FIGURE 1.

As thus far described, it will be clear that when the gear ratio selector lever is in the full line position shown, the leftward movement of link 68 will swing lever 60 clockwise and lever 52 counterclockwise to cause a counterclockwise arcuate movement of pin 42 into the end of slot 40 of lever 34, when the accelerator pedal 30 is in the released or idle speed condition shown. In this case, therefore, movement of the fuel and nozzle control levers 45 and 12 is then controlled as a function of depression or release of foot pedal 30.

It will also be clear that when the transmission gear ratio selector lever 72 is moved rightwardly to the Neutral position indicated, lever 60 will be swung counterclockwise and swing both lever 52 and pin 42 clockwise to move pin 42 out of slot 40 in lever 34. This thus disconnects lever 34 from the fuel and nozzle control throttle lever linkages 46, 44, and permits the throttle levers 45 and 12 to be returned to their idle speed positions by spring or other suitable means, not shown. Subsequent depression or release of foot pedal 30 is thus ineffective to control movement of links 44 or 46.

FIGURE 1 also shows an additional lock-out control mechanism to prevent movement of the transmission gear ratio selector lever (or clutch pedal) from a gear ratio established position if and whenever accelerator pedal 30 and/or fuel control lever 45 are moved away from their idle positions. More specifically, selector lever link 66 is connected pivotally both to a link 80 connected pivotally to selector valve link 16, and to a link 82 that is associated with fuel lever 45. Link 82 has a fixed pivot at 84, and the end of the link is adapted at times to abut the surface of a lock-out cam 86. The lock-out cam is integral with the end of lever 43, and rotates about a fixed pivot 88.

Lock-out cam 86 has both a convex-like arcuate cam surface 94 and a concave-like surface 96. It will be clear that when the transmission gear ratio selector lever 72 is in the full line gear ratio establishing position shown, the end of link 82 is positioned as shown in full lines to be adjacent the concave surface 96. Thus, the accelerator pedal 30 can be depressed or released without effecting a movement of or interference by link 82.

On the other hand, when accelerator pedal 30 is depressed, with transmission selector lever 72 in the same full line drive position shown, the counterclockwise rotation of lock-out cam 86 positions the edge of lock-out cam surface 94 such as to prevent pivotal movement of link 82 in a counterclockwise direction. This, therefore, prevents movement of the gear shift selector lever to the dotted line or Neutral position.

From the foregoing therefore, it will be seen that the invention provides a pedal disconnect linkage that effectively controls operation of the gas turbine engine, when the transmission is conditioned for Neutral or no-drive, by the effective disconnection of the accelerator pedal linkage from the fuel and nozzle control throttle levers 45 and 12, and also prevents placing of the transmission in Neutral subsequent to movement of the accelerator pedal beyond its idle position. It will also be seen; that as a result of the construction described and shown above, the transmission can be placed in Neutral without conditioning the engine for a dangerous operation due to accidental depression of the accelerator pedal; that, it permits the use of a manually operated transmission with a gas turbine engine in a motor vehicle, and that it permits the driving of the engine accessories by the engine output shaft instead of in the conventional manner by the gas generator section of the engine. The latter function is accomplished as a result of the governing of the engine output shaft speed at a constant value by the means fully shown and described in S.N. 515,356, when the nozzle control selector valve 20 is rotated 90° from the position shown due to the transmission selector lever 72 being moved to the Neutral position.

While the invention has been illustrated in its preferred embodiments in the figures, it will be clear to those skilled in the arts to which the invention pertains that

I claim:

1. An interconnected control linkage for a pair of movable members to be actuated comprising, first and second actuatable linkages connected respectively one to each of said pair of members for movement thereof, other movable linkage means between said first and second linkages including interconnecting means interconnecting said first and second linkages for a controlled relative movement therebetween, a first force transmitting element connected to said first linkage for movement of said first linkage and other linkage means, a second force transmitting element adapted to be connected at times to said second linkage for movement thereof, and engageable-disengageable means between said second linkage and second element engageable upon movement of said first element and other linkage means to one position to connect said second linkage and element for unitary movement permitting actuation of said second linkage and one of said members by said second element, and disengageable upon movement of said first element and other linkage to a second position to thereby disconnect said second linkage and element to render movement of said second element ineffective to move said second linkage and said one member.

2. A linkage as in claim 1, said interconnecting means including a relative movement compensator connection between said second linkage and other linkage means.

3. A linkage as in claim 1, said engageable-disengageable means including a relative movement compensator connector.

4. A linkage as in claim 1, said engageable-disengageable means comprising a pin fixed to one of said linkage and element and an open end slot in the other of said linkage and element.

5. A linkage as in claim 1, said other linkage means including first and second links pivotally secured respectively to said first and second linkages, and additional means pivotally securing said links to each other.

6. A linkage as in claim 4, said engageable-disengageable means comprising a pin fixed to one of said links and elements and an open end slot in the other of said links and elements.

7. A linkage as in claim 5, including a fixed fulcrum pivot for each of said links, said additional means comprising a pin and open end slot relative motion compensating connection.

8. A linkage as in claim 1, including further movable means operably connected to and between said first and second linkages having first and second portions connected respectively to said first and second linkages, and latch means between said portions operably movable to a latching position by and in response to movement of one of said elements while permitting further movement of the other of said elements.

9. A linkage as in claim 8, said portions each comprising a fixed fulcrum pivotal link pivotally connected to the linkage with which it is associated, said latch means including motion preventing stop means between said latter links operable during a first range of relative positions of said latter links to prevent further movement of said one element.

10. A linkage as in claim 9, said stop means comprising a cam secured to one of said latter links and engageable with a portion of the other of said latter links when said links are in said first range positions.

11. A control linkage for a motor vehicle comprising, a movable engine fuel control member movable between minimum and maximum fuel demand positions, a movable engine control, a movable transmission drive control member movable between positions establishing or breaking the powerflow path therethrough, a pair of movable linkage means operatively connected respective one to one of said members and the other to said control for movement of said control by the linkage means and said other linkage means by said one member, and coupling means between said pair of linkage means and the other of said members operable to engage said other member and one linkage means upon movement of said one member to one position and operable upon movement of said one member to another position to disengage said other member and one linkage means to thereby permit movement of said fuel control by said other member and one linkage means as a function of the position of said one member.

12. A control linkage as in claim 11, said one member being said fuel control member, and said other member being said transmission member, said one position of said one member being a transmission powerflow path establishing position, said another position of said one member being a transmission powerflow path interrupting position whereby said control member is operable to control movement of said fuel control when said transmission member is in a powerflow path establishing position and inoperable to control movement of said fuel control when said transmission member is in a powerflow path interrupting position.

13. A control linkage as in claim 12, said coupling means including first and second pivotally interconnected pivotal links each having a fixed fulcrum means and pivotal interconnecting means pivotally connecting said links one to said control member and the other of said links operably to the transmission member.

14. A control linkage as in claim 13, said coupling means also including a relative motion compensating connection between said first link and the linkage means connected to said fuel control.

15. A control linkage as in claim 14, said pivotal interconnecting means between said throttle member and one link including a pin and open end slot relative motion compensating connection permitting disengagement of said pin from said slot.

16. A control linkage as in claim 15, including additional member movement preventing means between said pair of linkage means preventing movement of said transmission member from a powerflow path establishing position when said control member is away from its minimum fuel demand position.

17. A control linkage as in claim 16, said movement preventing means including, a swingable lever having a fixed pivot and pivotally secured at one point to one of said linkage means, a second lever swingable about a fixed pivot and connected at one point to said fuel control connected linkage means, said second lever having a cam thereon having a movement preventing engagement with said first lever upon movement of said control member and fuel control linkage means away from the minimum control member position when said transmission member is in a powerflow path establishing position, movement of said cam to a control member minimum position disengaging said cam and second lever to permit movement of said transmission member to a transmission powerflow path interrupting position.

18. An interconnected throttle lever and transmission operability control lever linkage for use in a motor vehicle driven by a gas turbine engine, comprising, an operator movable accelerator pedal movable between engine idle and maximum speed positions, a movable fuel supply throttle valve member movable by and operably connected to said pedal by a first articulated linkage means, said engine having a power output shaft and rotatable means operably connected thereto for controlling rotation of said output shaft, said transmission lever being movable from a transmission gear ratio establishing position to a transmission non-drive establishing position, second linkage means operably connecting said rotatable means and said transmission lever for movement of said rotatable means by and in response to movement of said transmission lever, and interconnecting means operably interconnecting said accelerator pedal and transmission lever preventing movement of said transmission lever from a gear ratio establishing position so long as said accelerator pedal is positioned away from its minimum idle speed position, said latter means also rendering movement of said accelerator pedal ineffective to move said throttle valve member when said transmission lever is positioned in its non-drive position.

19. An interconnected linkage as in claim 18, said first linkage means including a relative motion compensating disengageable connection between said accelerator pedal and said throttle valve member, said latter connection comprising a pin engageable in an open end slot and disengageable by withdrawal from said slot to disconnect said accelerator pedal and throttle valve member connection, said interconnecting means including a link operably pivotally connected to and movable by said second linkage means and mounting said pin whereby movement of said transmission lever to said non-drive establishing position moves said link and withdraws said pin from said slot.

20. An interconnected linkage as in claim 19, said interconnecting means including a second link pivotally connected to said first mentioned link and to said second linkage means, said first and second links each having a fixed pivot axis.

21. An interconnected linkage as in claim 19, said first linkage means also including a force transmitting linkage pivotally connected to said throttle valve member and said link, the pivotal connection to said link comprising a relative motion compensating connection that is additional to the first mentioned motion compensating connection between said pedal and link, said link being pivotally movable about a fixed pivot.

22. An interconnected linkage as in claim 21, said interconnecting means including a second link pivotally connected to said first mentioned link and to said second linkage means, said second link having a fixed pivot axis.

23. An interconnected linkage as in claim 19, said movement preventing means including, a swingable lever having a fixed pivot and pivotally secured at one point to one of said linkage means, a second lever swingable about a fixed pivot and connected at one point to said fuel control connected linkage means, said second lever having a cam thereon having a movement preventing engagement with said first lever upon movement of said accelerator pedal and fuel control linkage means away from the minimum accelerator pedal position when said transmission lever is in a gear ratio establishing position, movement of said cam to a throttle valve member minimum fuel position disengaging said cam and second lever to permit movement of said transmission lever to a transmission non-drive position.

References Cited

UNITED STATES PATENTS

| | | | |
|---|---|---|---|
| 2,767,594 | 10/1956 | Du Shane | 74—878 |
| 2,771,168 | 11/1956 | Padish | 192—.096 |
| 2,785,584 | 3/1957 | Hambleton | 74—878 |
| 3,317,012 | 5/1967 | Heidner | 74—878 |

FRED C. MATTERN, JR., *Primary Examiner.*

H. S. LAYTON, *Assistant Examiner.*